United States Patent
Wang et al.

(10) Patent No.: US 9,338,861 B2
(45) Date of Patent: May 10, 2016

(54) METHODS AND APPARATUS FOR OPERATING A LIGHTING NETWORK ACCORDING TO ENERGY DEMAND AND ENERGY SUPPLY

(71) Applicant: KONINKLIJKE PHILIPS N.V., Eindhoven (NL)

(72) Inventors: Jianfeng Wang, Ossining, NY (US); Dave Alberto Tavares Cavalcanti, Mahopac, NY (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/386,353

(22) PCT Filed: Mar. 11, 2013

(86) PCT No.: PCT/IB2013/051917
§ 371 (c)(1),
(2) Date: Sep. 19, 2014

(87) PCT Pub. No.: WO2013/144756
PCT Pub. Date: Oct. 3, 2013

(65) Prior Publication Data
US 2015/0102747 A1 Apr. 16, 2015

Related U.S. Application Data

(60) Provisional application No. 61/616,634, filed on Mar. 28, 2012.

(51) Int. Cl.
*H05B 37/02* (2006.01)
*H02J 3/14* (2006.01)
*H02J 13/00* (2006.01)

(52) U.S. Cl.
CPC .............. *H05B 37/0254* (2013.01); *H02J 3/14* (2013.01); *H02J 13/0079* (2013.01); *H05B 37/0281* (2013.01); *Y02B 20/42* (2013.01); *Y02B 70/3225* (2013.01); *Y02B 70/3283* (2013.01); *Y04S 20/222* (2013.01); *Y04S 20/246* (2013.01)

(58) Field of Classification Search
USPC ........... 315/291, 294, 297, 307, 312; 700/295
See application file for complete search history.

(56) References Cited

U.S. PATENT DOCUMENTS

| | | | |
|---|---|---|---|
| 7,062,361 B1 | 6/2006 | Lane | |
| 7,274,975 B2 * | 9/2007 | Miller | G06Q 50/06 700/295 |
| 2004/0002792 A1 | 1/2004 | Hoffknecht | |
| 2010/0295475 A1 | 11/2010 | Chemel | |
| 2011/0231028 A1 | 9/2011 | Ozog | |
| 2011/0231320 A1 | 9/2011 | Irving | |

FOREIGN PATENT DOCUMENTS

| | | |
|---|---|---|
| JP | 05284649 A | 10/1993 |
| JP | 2003309929 A | 10/2003 |
| JP | 2009240032 A | 10/2009 |
| JP | 2011142753 A | 7/2011 |
| WO | 2009129232 A | 10/2009 |
| WO | 2012093324 A1 | 12/2011 |
| WO | 2012137104 A1 | 10/2012 |

* cited by examiner

*Primary Examiner* — Douglas W Owens
*Assistant Examiner* — Jonathan Cooper (57) ABSTRACT

Methods and apparatus related to operation of a plurality of lighting units of a lighting network according to energy demand and/or energy supply.

17 Claims, 7 Drawing Sheets

| DR level | Dimming vector |
|---|---|
| 1 | $D^1 = [...,d_i^1,...]^T$ |
| 2 | $D^2 = [...,d_i^2,...]^T$ |
| 3 | $D^3 = [...,d_i^3,...]^T$ |
| . | . |
| . | . |
| . | . |

FIG. 5A

| DR subinterval | Dimming level |
|---|---|
| 1 | d(1) |
| 2 | d(2) |
| 3 | d(3) |
| . | . |
| . | . |
| . | . |
| N | d(N) |

FIG. 5B

| DR subinterval | Energy source |
|---|---|
| 1 | |
| 2 | . |
| 3 | . |
| . | . |
| k | Battery vs grid/utility. For example, if energy price from grid/utility during certain DR subinterval is high, battery storage will used for lighting operation. |
| . | . |
| N | . |

FIG. 5C

| DR subinterval | Battery charge |
|---|---|
| 1 | |
| 2 | . |
| 3 | . |
| . | . |
| k | Whether to charge battery from main grid/utility, say taking advantage of low energy price during the DR subinterval? |
| . | . |
| N | . |

FIG. 5D

| DR subinterval | LOD setting |
|---|---|
| 1 | |
| 2 | . |
| 3 | . |
| . | . |
| k | Triggering event and ON time |
| . | . |
| N | . |

METHODS AND APPARATUS FOR OPERATING A LIGHTING NETWORK ACCORDING TO ENERGY DEMAND AND ENERGY SUPPLY

TECHNICAL FIELD

The present invention is directed generally to operation of a lighting network. More particularly, various inventive methods and apparatus disclosed herein relate to operation of a lighting network according to energy demand and/or energy supply.

BACKGROUND

Lighting comprises a large portion of energy consumption in buildings and infrastructures. For instance, in some situations lighting systems may consume approximately 20% of the energy used in buildings and approximately 38% of the electricity used in buildings. Furthermore, a large part of lighting use occurs during times of high energy consumption.

Transformation of power grids into smart grids is being promoted by many governments as a way of addressing energy independence and sustainability, global warming, and emergency resilience issues. A smart grid transforms the way power is generated, delivered, consumed and billed. Adding intelligence throughout a networked power grid increases grid reliability, improves demand handling and responsiveness, increases efficiency, better harnesses and integrates renewable/distributed energy sources, and potentially reduces costs for the provider and/or consumers.

Lighting systems will be one of the important component systems of a smart grid for dynamic load management services such as demand response (DR). For instance, California Title 24 (CA T24) requires lighting systems to have the capability of shedding a connected load upon reception of a DR signal from a smart grid. Many challenges exist with dynamic load management in order to match electricity generation and transmission/usage in such a smart grid. For example, existing load management strategies are event driven and reactive, managing the load (load shedding) only when receiving DR signals from the smart grid.

Thus, there is a need in the art to provide methods and apparatus that proactively budget electricity use of one or more lighting networks and manage the load of such lighting networks.

SUMMARY

The present disclosure is directed to inventive methods and apparatus for operation of a lighting network. For example, inventive methods and apparatus disclosed herein relate to operation of a plurality of lighting units of a lighting network according to energy demand and/or energy supply. In some embodiments demand response of a smart grid may be proactively managed based on time intervals and/or the zone of the lighting units of the lighting network. In some embodiments the security of one or more transmissions in the lighting network may be dependent on the importance of a transmitted demand response signal.

Generally, in one aspect, a method of proactively adjusting energy demand of at least one outdoor lighting network connected to a smart power grid is provided and includes the following steps: collecting first zone energy supply information and first zone load demand information of each of a plurality of first zone lighting units of the lighting network for each of a plurality of first zone subintervals; collecting second zone energy supply information and second zone load demand information of each of a plurality of second zone lighting units of the lighting network for each of a plurality of second zone subintervals; receiving electricity prices from a utility for a plurality of future first zone subintervals of the first zone subintervals and for a plurality of future second zone subintervals of the second zone subintervals; proactively adjusting a first zone light operation strategy of the first zone lighting units prior to the future first zone subintervals based on the first zone energy supply information, the first zone load demand information, and the electricity prices; and proactively adjusting a second zone light operation strategy of the second zone lighting units prior to the future second zone subintervals based on the second zone energy supply information, the second zone load demand information, and the electricity prices.

In some embodiments the method further includes the step of bidding the electricity prices from the utility based on the first zone load demand information and the second zone load demand information.

In some embodiments the step of proactively adjusting the first zone light operation strategy of the first zone lighting units prior to the future first zone subintervals is also based on first zone lighting regulation requirements of the first zone. In some versions of those embodiments the step of proactively adjusting the second zone light operation strategy of the second zone lighting units prior to the future second zone subintervals is also based on second zone lighting regulation requirements of the second zone. In some versions of those embodiments the second zone lighting regulation requirements are of lesser priority than the first zone lighting regulation requirements and the second zone light operation strategy is adjusted more drastically than the first zone light operation strategy.

In some embodiments the step of proactively adjusting the first zone light operation strategy of the first zone lighting units prior to the future first zone subintervals is also based on dimming capabilities of the first zone lighting units.

In some embodiments the step of proactively adjusting the first zone light operation strategy of the first zone lighting units includes dimming the first zone lighting units according to one of a plurality of first zone lighting unit dimming vectors each corresponding to one of a plurality of first zone demand response levels. In some versions of those embodiments the step of proactively adjusting the second zone light operation strategy of the second zone lighting units includes dimming the second zone lighting units according to one of a plurality of second zone lighting unit dimming vectors each corresponding to one of a plurality of second zone demand response levels. In some versions of those embodiments the first zone lighting unit dimming vectors and the first zone demand response levels are normalized to the second zone lighting unit dimming vectors and the second zone demand response levels, in terms of relative lighting performance to best-practice lighting performance.

In some embodiments the step of proactively adjusting the first zone light operation strategy of the first zone lighting units prior to the future first zone subintervals includes proactively charging an off-grid power source with the smart power grid prior to utilizing the off-grid power source to power at least one of the first zone lighting units during at least one of the future first zone subintervals.

Generally, in another aspect, a method of adjusting energy demand of at least one outdoor lighting network connected to a smart power grid is provided and includes the following steps: dimming lighting units of the lighting network according to one of a plurality of lighting unit dimming vectors each corresponding to one of a plurality of demand response levels, wherein the lighting units are dimmed most drastically at a highest of the demand response levels and are dimmed least drastically at a lowest of the demand response levels; receiving a demand response signal corresponding to one of the demand response levels; and transmitting a dimming signal to cause dimming of the lighting units in correspondence with the demand response signal. When the demand response signal corresponds to the lowest of the demand response levels a first security level is applied to the dimming signal. When the demand response signal corresponds to the highest of the demand response levels a second security level is applied to the dimming signal and the second security level is more secure than the first security level.

In some embodiments the first security level includes a single authentication method. In some versions of those embodiments the second security level includes at least two authentication methods.

In some embodiments the method further includes the step of dimming second lighting units of the lighting network according to one of a plurality of second lighting unit dimming vectors each corresponding to one of a plurality of the demand response levels, wherein the second lighting units are dimmed most drastically at the highest of the demand response levels and are dimmed least drastically at the lowest of the demand response levels. In some versions of those embodiments the first lighting unit dimming vectors are normalized to the second lighting unit dimming vectors and the second zone demand response levels, in terms of relative lighting performance to best-practice lighting performance. In some versions of those embodiments the first lighting units have first zone lighting regulation requirements and the second lighting units have second zone lighting regulation requirements. The second zone lighting regulation requirements may optionally be of lesser priority than the first zone lighting regulation requirements and dimming adjusted more drastically among the second lighting units than the first lighting units in response to the highest of the demand response levels.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Transformation of power grids into smart grids is being promoted by many governments as a way of addressing energy independence and sustainability, global warming, and emergency resilience issues. Lighting systems will be one of the important component systems of a smart grid for dynamic load management services such as DR. Many challenges exist with dynamic load management in order to match electricity generation and transmission/usage in such a smart grid. For example, existing load management strategies are event driven and reactive, managing the load (load shedding) only when receiving DR signals from the smart grid. Thus, Applicants have recognized and appreciated a need to provide methods and apparatus that proactively budget electricity use of one or more lighting networks and manage the load of such lighting networks.

More generally, Applicants have recognized and appreciated that it would be beneficial to provide methods and apparatus related to operation of a lighting network according to energy demand and/or energy supply.

In view of the foregoing, various embodiments and implementations of the present invention are directed to operation of a lighting network.

Figure 1:
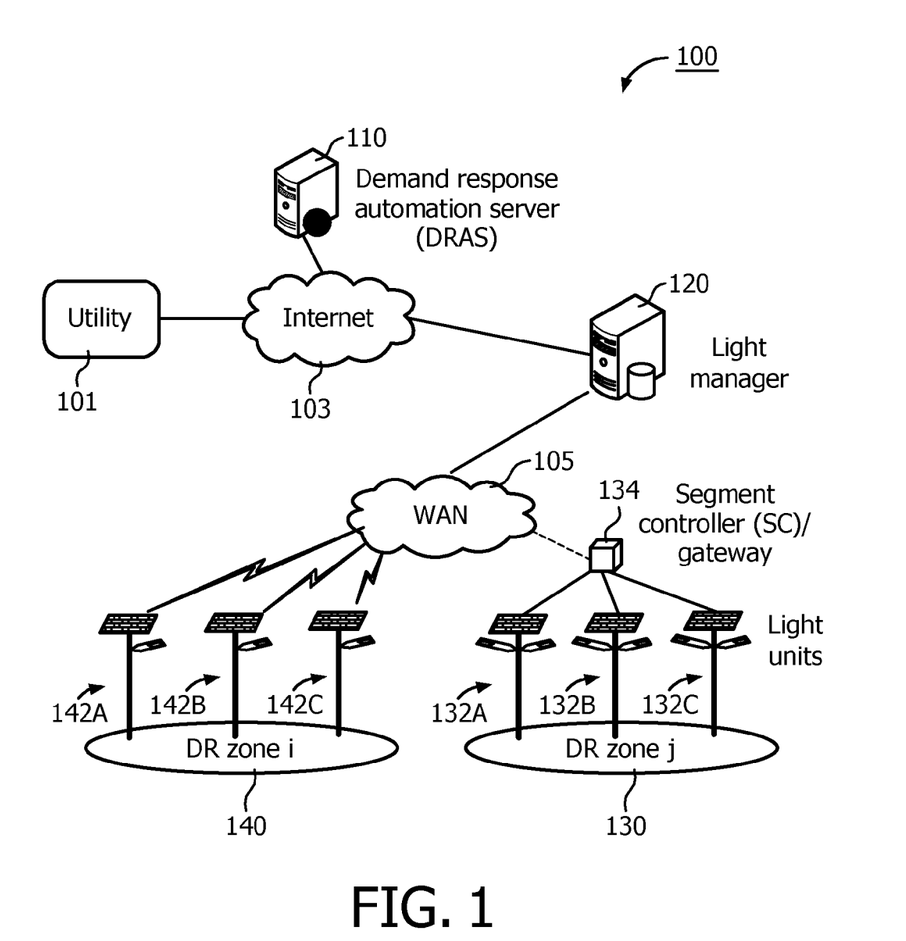
FIG. 1 illustrates an embodiment of a lighting network that includes a light manager managing lighting units according to energy demand and supply dynamics.

Referring to FIG. 1, an embodiment of a lighting network 100 is illustrated. The lighting network 100 includes a demand response automation server (DRAS) 110, a light manager 120, a first demand response zone 130, and a second demand response zone 140 that are in network communication with one another. The DRAS 110 is in communication with the light manager 120 via internet connection 103 and is also in communication with a utility 101 via internet connection 103. The DRAS 110 may provide DR events to the light manager 120. The light manager 120 may communicate with the DRAS 110 to bid electricity for future DR intervals. The DRAS 110 may optionally communicate with the utility 101 to determine when to provide DR events and/or to determine appropriate amounts of and/or prices for electricity in bidding electricity for future intervals.

The light manager 120 is in communication with each of three lighting units 142A, 142B, and 142C of the second demand response zone 140 via wide area network (WAN) 105. The light manager 120 is in communication with each of three lighting units 132A, 132B, and 132C of the first demand response zone 130 via wide area network (WAN) 105 and segment controller 134. As discussed herein, the light manager 120 automates the operation of one or more light sources within demand response zones 130, 140 according to energy demand and supply dynamics (e.g., status of the main power grid, pricing of electricity from the main power grid, transmitted DR events, capabilities of lighting units 132A-C, 140A-C, proactive adjustments of lighting units 132A-C, 140A-C, and/or status of any off-grid energy supply).

The illustrated lighting units 142A-C each include an off-grid solar panel (optionally in combination with a storage battery) atop a mounting pole and a single lighting housing extending from the mounting pole. Each lighting housing includes at least one light source. The light sources of lighting units 142A-C are electrically coupled to a main power grid and are at least partially selectively powered by the main power grid. Each of the lighting units 142A-C may also be at least partially powered by one or more of the off-grid solar panels of the lighting units 142A-C. For example, in some embodiments the off-grid solar panels may all charge a single storage battery that selectively powers one or more of the lighting units 142A-C. Also, for example, in some embodiments the off-grid solar panels may each be electrically coupled (optionally via a storage battery) to a light source of a single of the lighting units 142A-C. In some embodiments the lighting units 142A-C may each have similar lighting function requirements. For example, each of the lighting units 142A-C may each have similar lighting regulation requirements (e.g., express road lighting requirements, local road lighting requirements, parking lot lighting requirements).

Figure 9:
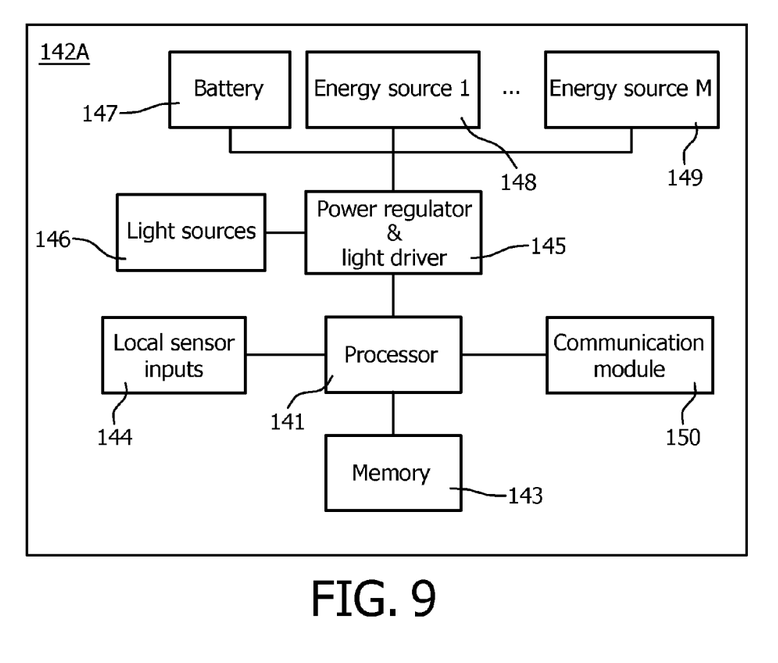
FIG. 9 illustrates a schematic representation of an embodiment of a local light controller.

Referring to FIG. 9, a schematic representation of an embodiment of the lighting unit 142A is illustrated. The lighting unit 142A includes a processor or controller 141 that is in communication with a communication module 150, memory 143, local sensor inputs 144, and a power regulator and light driver 145. The processor 141 controls the light driver 145 based on input received from light manager 120 via lighting manager 142 and optionally based on values in memory 143, and/or input received from local sensor inputs (e.g., daylight sensor, motion sensor). The light driver 145 drives one or more light sources 146 in accordance with input received from processor 141. One or more energy sources may be at least selectively coupled to the light driver 145 such as battery 147, energy source 148, and energy source 149. In some embodiments energy source 149 may be the main grid energy source.

Referring again to FIG. 1, the illustrated lighting units 132A-C each include an off-grid solar panel (optionally in combination with a storage battery) atop a mounting pole and a pair of lighting housings extending from the mounting pole. Each lighting housing may include at least one light source. The light sources of lighting units 132A-C are electrically coupled to a main power grid and are at least partially selectively powered by the main power grid. Each of the lighting units 132A-C may also be at least partially powered by one or more of the off-grid solar panels of the lighting units 132A-C. In some embodiments the lighting units 132A-C may each have similar lighting function requirements.

Figure 8:
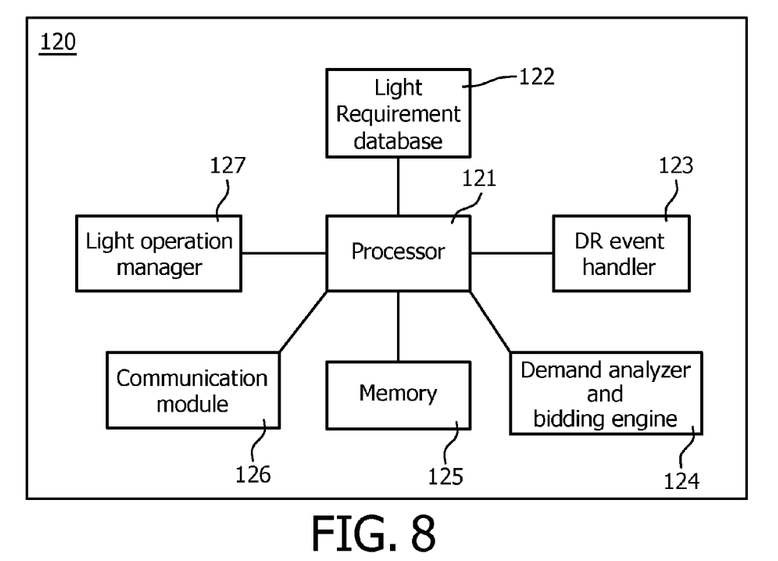
FIG. 8 illustrates a schematic representation of an embodiment of a light manager.

Turning briefly to FIG. 8, a schematic representation of the light manager 120 is illustrated. The light manager 120 includes a controller or processor 121 that is in communication with a light requirement database 122, a DR event handler 123, a demand analyzer and bidding engine 124, memory 125, a communication module 126, and a light operation manager 127. In some embodiments the processor 121 and/or modules 122-127 may be implemented on one or more computers. In some embodiments one or more of the modules 122-127 may be implemented in the same hardware or pieces of hardware and/or in the same software of pieces of software.

Figure 2:
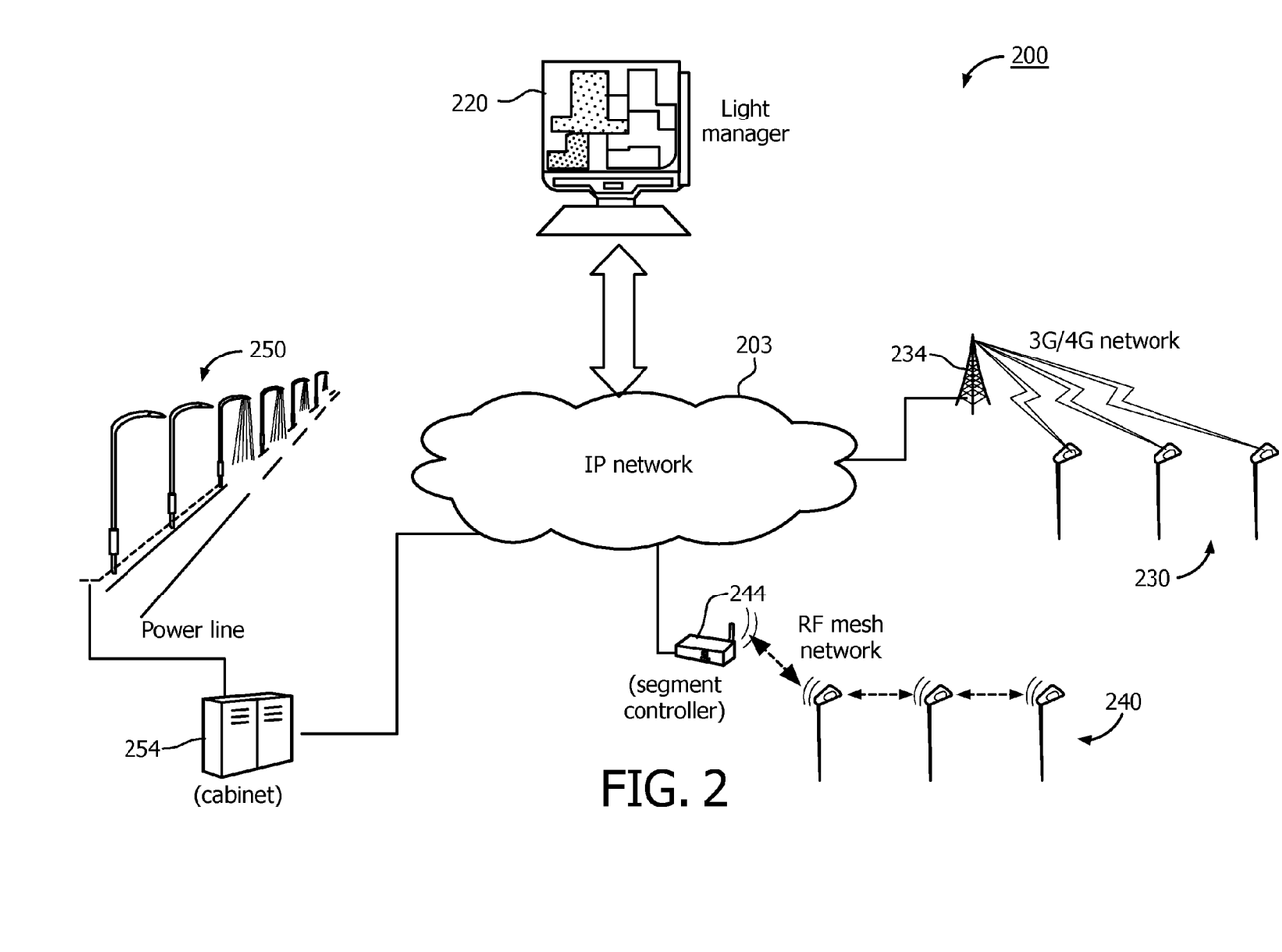
FIG. 2 illustrates another embodiment of a lighting network that includes a light manager managing lighting units according to energy demand and supply dynamics.

FIG. 2 illustrates another embodiment of a lighting network 200 that includes a light manager 220 managing lighting units according to energy demand and supply dynamics. The light manager 220 is in communication with each of three demand response zones 230, 240, and 250 via network 203. Network 203 may include, for example, one or more networks such as the internet, a private network, and/or other network. Network 203 is in communication with each of a plurality of lighting units of first demand response zone 230 via a cellular network transmitted by one or more cellular towers 234. Network 203 is in communication with each of a plurality of lighting units of second demand response zone 240 via wireless transmissions from segment controller 244 and a wireless RF mesh network between the lighting units. Network 203 is in communication with each of a plurality of lighting units of third demand response zone 250 via a power and control cabinet 254.

The light sources of the lighting units of demand response zones 230, 240, and 250 are electrically coupled to a main power grid and are at least partially selectively powered by the main power grid. The light sources of one or more of the lighting units of demand response zones 230, 240, and/or 250 may additionally be selectively electrically coupled to one or more off-grid power sources (e.g., solar panel, wind turbine, previously stored energy from the main grid). In some embodiments one or more of the demand response zones 230, 240, and 250 may have unique capabilities and/or implementations (e.g., the zones 230, 240, and 250 may each be from a unique vendor). In some embodiments the lighting units from a single of the demand response zones 230, 240, and 250 may all have similar lighting function requirements.

Figure 3:
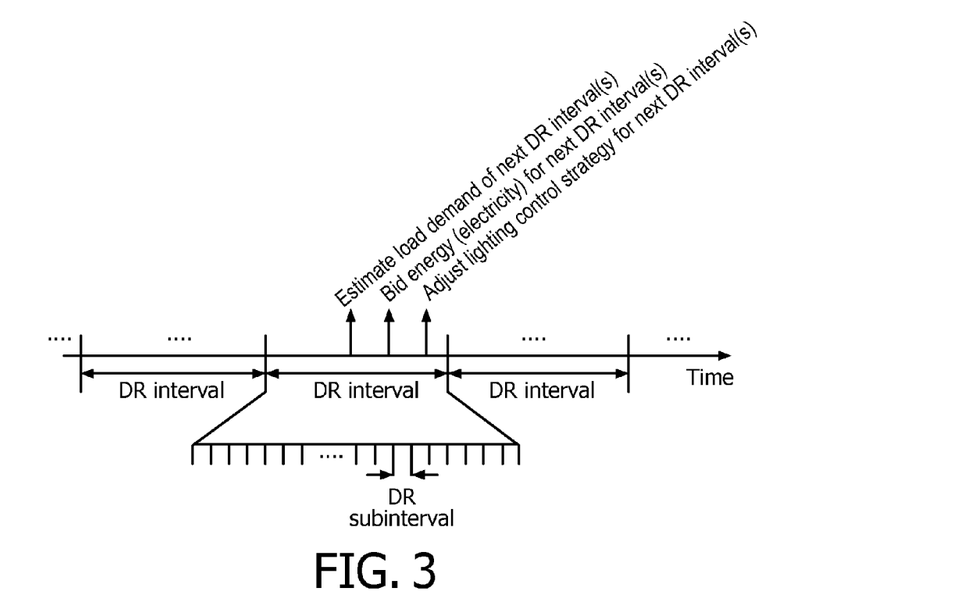
FIG. 3 illustrates a time diagram for an embodiment of proactive energy bidding and planning for lighting operation.

FIG. 3 illustrates a time diagram for an embodiment of proactive energy bidding and planning for lighting operation. The bidding and planning for lighting operation may be performed by the lighting manager 120, 220. For example, planning may occur locally at the lighting manager 120 and bidding may occur via communication between lighting manager 120 and the demand response automation server 110. Demand analyzer and bidding engine 124 may be utilized for bidding with the demand response automation server 110. Also, for example, planning may occur locally at the lighting manager 220 and bidding may occur via communication between lighting manager 220 and a demand response automation server and/or utility via network 203. As illustrated in FIG. 3, time is divided into DR intervals (three of which are illustrated). Each DR interval is further divided into DR subintervals. A plurality of the DR subintervals for the middle DR interval are illustrated in FIG. 3. As illustrated in the middle DR interval of FIG. 3, in each DR interval the light manager 120, 220 can estimate energy supply and demand information of its managed lighting units for the next DR interval(s), may bid the energy (electricity) price for the next DR intervals, and/or may adjust the lighting control strategy for one or more managed lighting units for future DR interval(s) based on the bidding results. The DR subintervals may be of such a length that within each DR subinterval the energy supply and energy demand is relatively stable. For example, in some embodiments a DR interval is approximately a day and a DR subinterval is approximately an hour.

Figure 4:
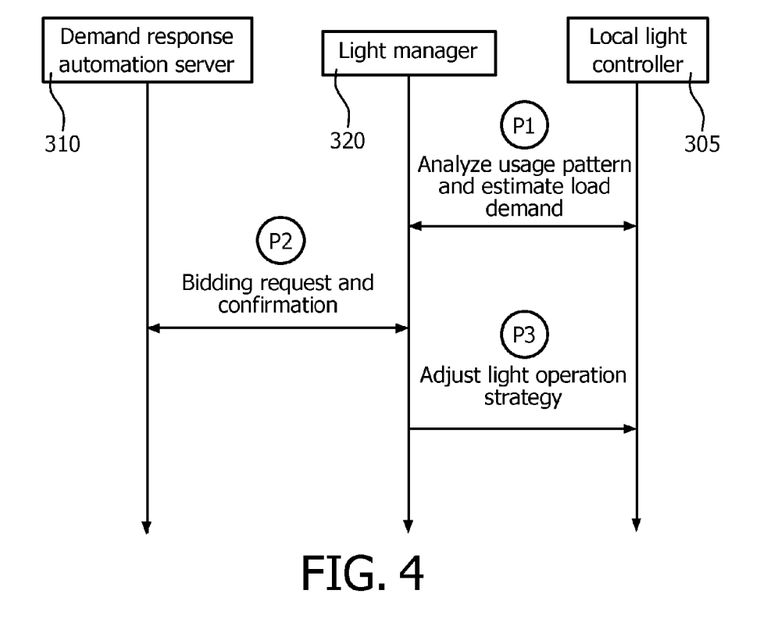
FIG. 4 illustrates a flow chart of an embodiment of proactive energy bidding and planning for lighting operation.

FIG. 4 illustrates a flow chart of an embodiment of proactive energy bidding and planning for lighting operation. A local light controller 304 is responsible for individually controlling the operation of a lighting unit or is in group control of numerous lighting units, depending on system architecture. For example, as shown in FIG. 2, a control and power cabinet 254 of a Powerline based outdoor lighting network (OLN) and a segment controller 244 of a RF based OLN are each group light controllers controlling numerous lighting units. Also, for example, as shown in FIG. 2, a cellular tower 234 of a cellular communication based OLN is in communication with each of a plurality of lighting units, and each of those lighting units includes a local light controller controlling that lighting unit. A given lighting network may include one or more local light controllers that individually control lighting units and/or one or more local light controllers that are in group control of numerous lighting units.

In step P1 of FIG. 4, a light manager 320 collects energy usage and energy supply information from its managed lighting units via one or more local light controllers 305, analyzes such information, and estimates the load demand of its managed lighting units for one or more upcoming DR intervals. For example, the light manager 320 may collect energy supply information related to one or more off-grid power sources (e.g., distributed energy source, solar panel, wind) via one or more local light controllers 305. The energy supply information of a lighting unit for future DR intervals may be based on any such off-grid energy supply that may be utilized for light operation of the lighting unit in one or more DR subintervals. The battery capacity and/or renewable energy charge rate of any off-grid energy supply may be taken into consideration. Also, other information related to the off-grid energy supply may be taken into consideration, such as weather forecast information to estimate the off-grid energy source supply (e.g., sun forecast for off-grid solar panel, wind forecast for off-grid wind turbine).

Also, for example, the light manager 120, 220 may estimate the energy demand from the lighting units for one or more future DR intervals based on the energy usage of the lighting units in preceding DR intervals as well as the forecast of one or more upcoming DR intervals. The estimated energy demand and supply of a lighting unit for one or more future DR intervals may be based on one or more attributes. For example, the energy demand may be based on input power per lighting unit in each DR subinterval (e.g., defined based on a combination of the type of light source utilized in each lighting unit, the light source capabilities (e.g., whether dimmable, how many dimming steps are provided), and/or any regulations and/or standard requirements (e.g., at least a minimum luminosity for certain installation areas (e.g., intersection requirements, parking lot requirements, roadway requirements) and/or certain times of day). For example, the best-practice (typical) input power, the maximum input power, and the minimum input power may all be analyzed for a lighting unit or group of lighting units.

The best-practice, maximum, and minimum input powers for a lighting unit are determined by respective of best-practice, maximum, and minimum light output for that lighting unit and by the dimming capability for that lighting unit. The maximum and minimum light outputs (luminance and/or illuminance intensity and distribution) may be defined by one or more applicable regulation standards according to the area type (e.g., Freeway Class A, Freeway Class B, Expressway, Major, Collector, Local, walkways/bikeways, intersection, parking lot, the pavement type, and/or the pedestrian conflict level). For example, regulations typically require light output in an intersection area to be of higher luminosity than the light output on the rest of road and minimum light output power at such intersections may therefore be higher. The best-practice light output may be determined according to, for example, one or more of local user preference, traffic volume, crime index, and/or weather. For example, more light may be desired during inclement weather (rain, snow, heavy clouds) and weather forecast may thus be used in determining the best-practice light output for next DR intervals. Also, for example, the best-practice light output for a group of lighting units placed a high crime area may be of a greater luminosity than if that group of lighting units was placed in a low crime area.

The best-practice, maximum, and/or minimum input powers may vary over time (e.g., from one DR subinterval to the next DR subinterval) and/or by DR zone (e.g., from one DR zone (located in a parking lot) to another DR zone (located on a highway)) and taken into account by the light manager 320 in determining likely needed input powers over each DR subinterval. For example, the required or allowed operation ranges for illuminance and power may be defined by adaptive lighting regulations applicable to a given area. For example, light output needed during the hours of 7:00-9:00 pm is normally higher than that needed during the hours of 12:00-4:00 am. Also, for example, light output needed in high pedestrian traffic areas may be higher than that needed in low pedestrian traffic areas. Also, for example, with season changes and the changing sunrise/sunset time, the on/off time and/or dimming schedule may be changed accordingly and taken into account by the light manager 320 in determining likely needed input powers over each subinterval.

Turning briefly to the schematic representation of the light manager 120 of FIG. 8, the light manager 120 may utilize the light requirement database 122 to store the applicable regulatory requirements for attached lighting units, to store the location of attached lighting units, to store characteristics and operating status of attached lighting units, and/or to store the associated area type of attached lighting units. The light manager 120 may additionally or alternatively access external services or databases (e.g. city/government databases) in order to obtain information on applicable regulatory requirements, lighting unit locations, and/or other city information/ characteristics associated with the area. In some embodiments, the light manager 120 may estimate the energy demand of attached lighting units based at least in part on information stored in the databases. The light manager 120 may also use measurements collected from one or more field devices (e.g., power metering of one or more attached lighting units). The light manager 120 may retrieve the data directly from attached lighting units (e.g., local sensor inputs 144) and/or from other intermediate devices (segment controllers, gateways, etc.). In some embodiments, measurements collected from field devices may follow a standard format. In some embodiments the lighting manager 120 and the lighting units may communicate (e.g., via communication modules 126 and 150) using the standard format. In some embodiments intermediate devices (segment controller, gateways, etc.) may translate communications between the light manager 120 and the lighting units. The light manager 120 may calculate the aggregate energy demand per DR zone and per DR subinterval.

Referring again to FIG. 4, in step P2, the light manager 320 bids electricity from the DRAS 310 based on the light manager's estimated minimum and maximum energy requirements per DR zone per DR subinterval for the next DR interval(s). A demand analyzer and bidding engine such as engine 124 and a communications module such as module 126 may be utilized to bid electricity from the DRAS 310. The inputs to the DRAS 310 from the light manager 320 for bidding electricity may include minimum and maximum energy requirements for each DR subinterval in each DR zone, among others. The energy price and availability from the utility could vary from place to place. The outputs of the bidding process from the DRAS 310 to the light manager 320 are minimum and maximum energy supply and price offering for each DR subinterval in each DR zone. The bidding process is done periodically—for example, DR interval by DR interval. At the end of each DR interval, the light manager 320 estimates the energy usage for one or more upcoming DR intervals and bids the energy for the one or more upcoming DR intervals. The bidding process can additionally or alternatively be triggered on-demand (e.g., by receiving a demand response signal from the DRAS 310) during certain circumstances. For example, if the energy supply/price from the utility is changed within a DR interval dramatically, the light manager 320 may start the bidding process (optionally after receiving signaling from the DRAS 310) without waiting for the next scheduled bidding time.

In step P3 of FIG. 4, the light manager 320 adjusts the light control strategy of attached lighting units if necessary. The adjustment by the light manager 320 is to optimize the use of energy according to the offered price and amount of energy from bidding in step P2. To determine appropriate energy planning and optimization, the light manager 320 analyzes the minimum and maximum energy supply (cap) and price offered in step P2 by the utility or DRAS 310 for each DR subinterval in each DR zone. The light manager 320 may also analyze the optimized dimming vector for different DR levels in each DR zone, as illustrated in FIG. 5A.

Figure 5A:
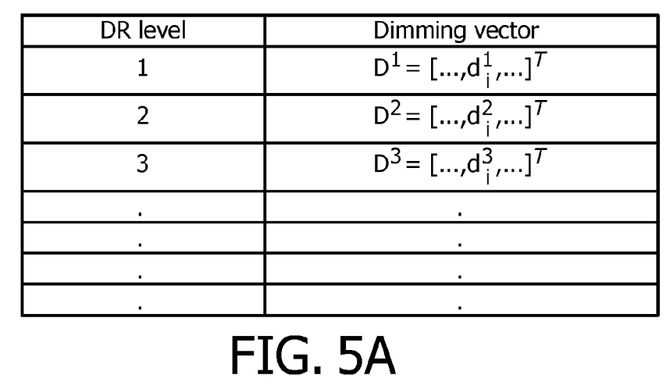
FIG. 5A illustrates a table of dimming vectors for different demand response levels.

FIG. 5A illustrates the dimming vector for different DR levels for a single DR zone. In FIG. 5A, $d_i^j$ denotes the dimming level of a lighting unit i at DR level j. Two lighting units in a dimming vector may have different dimming levels taking into account any area function requirement and dimming flexibility of the lighting units. The light manager defines a number of DR levels per DR zone, with the lowest DR level (DR level 1) corresponding to the best case scenario (e.g., optimal lighting output for when energy is abundant and cheap) and the highest DR level corresponding to the worst case scenario (e.g., non-optimal lighting output that may violate minimum lighting performance requirements for when the most load shedding is requested by the DRAS 310). A meaningful step size (reflected by a certain amount of energy consumption reduction and lighting performance degradation) is defined from one DR level to the next DR level. DR levels across multiple DR zones may be normalized and therefore comparable in terms of relative lighting performance of a DR zone to its own best-practice lighting performance. The reduced energy consumption may be distributed across lighting units of a DR zone in such a way that the lighting performance is optimized (in intensity and/or uniformity across area) given the total amount of available energy within the DR zone. The light manager 320 stores the optimized dimming vector for different DR levels and implements dimming levels during DR subintervals that are appropriate to the DR level of the DR subinterval.

The optimized dimming vector for different DR levels in a DR zone may consider area function requirements and/or dimming flexibility of light units. For example, the DR area type and characteristics may be considered (e.g., Road: Freeway Class A, Freeway Class B, Expressway, Major, Collector, Local; Walkways/bikeways; Intersection; and/or Pedestrian conflict level: high, medium, low). Also, for example, lighting performance requirements may be considered and the priority for meeting those lighting performance requirements. Lighting performance requirements may include average intensity, uniformity, and/or color temperature. Illuminance and uniformity metrics may include percentage of Grid Points Illuminated (GPI) and average illuminance, coefficient of variation (CV), average-to-min uniformity ratio (AMU), and/or max-to-min uniformity ratio (MMU). Such requirements may be stored, for example, in one or more database such as light requirement database 122. Also, for example, dimming flexibility may be considered and may take into account the amount of light output as compared to the input power, the dimming range of light sources, and/or the step sizes between dimming levels of light sources.

As discussed herein, to plan and optimize the usage of energy, the light manager 320 may find the lowest DR level needed (and closest to best-practice input power level) in order to meet the total energy and cost requirements for a given DR subinterval in a given DR zone, while optimizing the lighting performance. This may be accomplished in a light operation manager such as light operation manager 127. In some embodiments it may be desirable for different DR zones to share the same DR level. In some embodiments DR zones may be prioritized based on, for example, DR area type and characteristics. If some DR zones have to go up one DR level (and have diminished light output) to meet a load shedding requirement, the DR zones with lower priority will be first chosen to shed load. As discussed herein, energy budgeting may occur across each of a plurality of DR subintervals so that the choice of energy source (main grid or off-grid), dimming levels, and/or the decision whether to charge a storage battery will be made during certain DR subintervals.

Figure 5B:
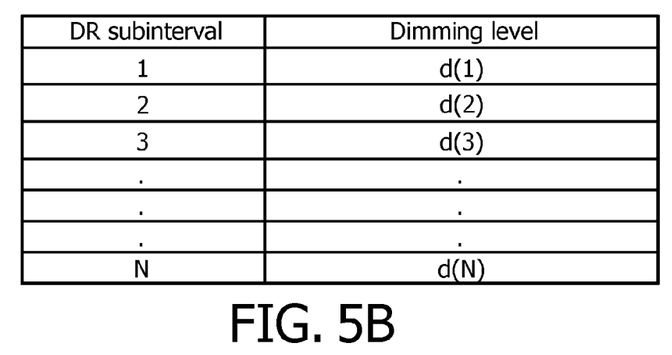
FIG. 5B illustrates a table of a dimming schedule for a lighting unit for different demand response subintervals.
Figure 5C:
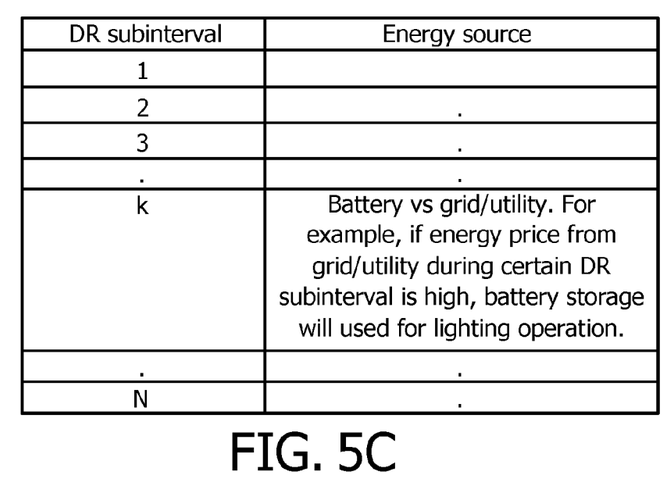
FIG. 5C illustrates a table of an energy source choice for a lighting unit for different demand response subintervals.

Based on analysis of the minimum and maximum energy supply (cap) and price offered in step P2 and the optimized dimming vector for different DR levels in each DR zone, lighting manager 320 may then appropriately adjust one or more aspects of the control of attached lighting units. For example, the lighting manager 320 may adjust the dimming schedule of lighting units (e.g., provide more dimming during periods of high price and/or low amounts of energy). Data related to dimming schedule may be transmitted from the lighting manager 320 to local light controller 305 and may provide a dimming level for each DR subinterval. For example, a message having a format such as that illustrated in FIG. 5B may be transmitted to local light controller 305 informing the light controller 305 of appropriate dimming levels of one or more lighting units during each DR subinterval. Also, for example, the lighting manager 120, 220 may adjust the choice of energy source (e.g., an off-grid energy source vs. main grid source) for lighting operation for each DR subinterval (e.g., switch to or supplement with an off-grid source during periods of high price and/or low amounts of energy). Data related to energy source choice may be transmitted from the lighting manager 120, 220 to local light controller 305. For example, a message having a format such as that illustrated in FIG. 5C may be transmitted to local light controller 305 informing the light controller 305 during which DR subintervals one or more lighting units should utilize the main grid and during which DR subintervals one or more lighting units should utilize a non-grid energy source.

Figure 5D:
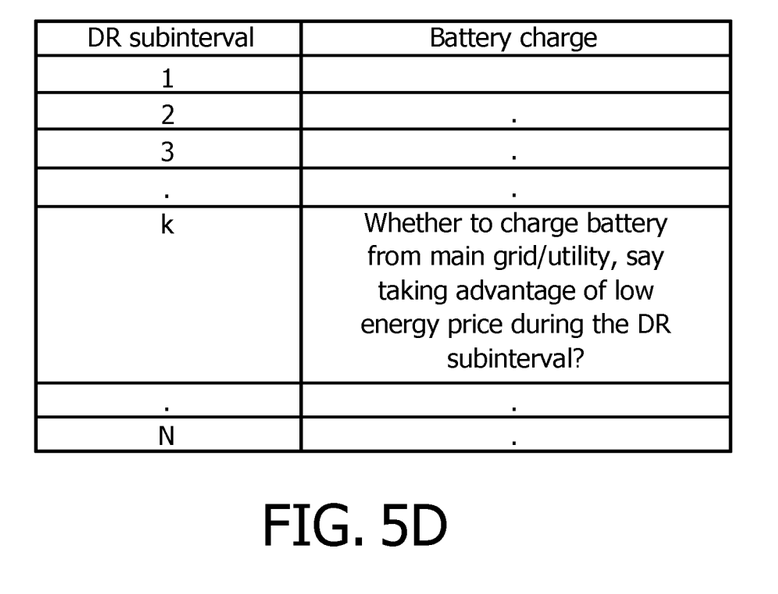
FIG. 5D illustrates a table of a battery charge indication for a lighting unit for different demand response subintervals.

Also, for example, the lighting manager 320 may determine whether to charge a storage battery using the main grid during each DR subinterval. It may be desirable to charge a storage battery using the main grid during DR subintervals where the price of energy is low and/or the amounts of energy available are high and store that energy for usage by the lighting units during DR subintervals where the price of energy is high and/or the amounts of energy available are low. Data related to whether to charge a storage battery may be transmitted from the lighting manager 320 to local light controller 305. For example, a message having a format such as that illustrated in FIG. 5D may be transmitted to local light controller 305 informing the light controller 305 of DR subintervals when a storage battery should be charged from the main grid.

Figure 5E:
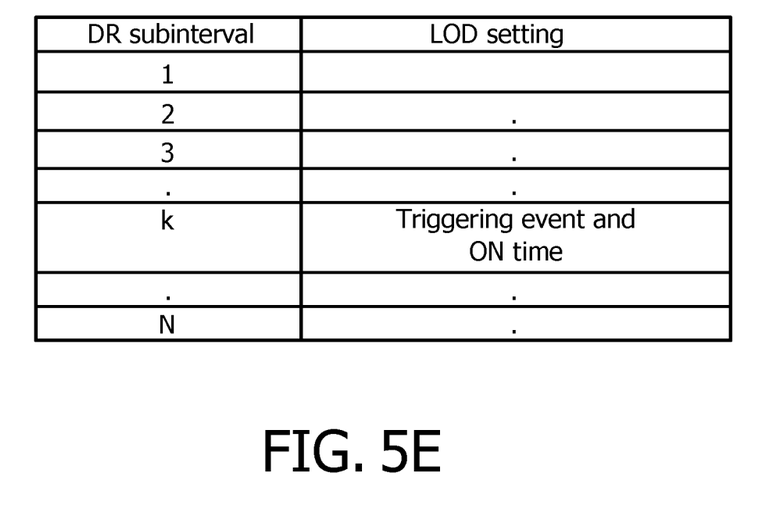
FIG. 5E illustrates a table of a lighting on demand setting for a demand response zone for different demand response subintervals.

Also, for example, the light manager 320 may adjust the Light on Demand (LOD) operation setting for a DR zone over one or more DR subintervals. The light manager 320 may determine whether to put LOD mode on for one or more lighting units and optionally set parameters of the LOD mode (e.g., triggering events and ON time after being triggered). A local light controller with LOD function includes local sensors (e.g., connected to the lighting unit wired or wirelessly) such as a camera, an infrared sensor, an acoustic sensor, and/or other motion/presence sensor to detect objects/traffic such as pedestrian and/or vehicles. Data related to the LOD mode and/or LOD mode parameters may be transmitted from the lighting manager 320 to local light controller 305. For example, a message having a format such as that illustrated in FIG. 5E may be transmitted to local light controller 305 informing the light controller 305 of DR subintervals when LOD mode should be active and the parameters for the LOD mode.

Although certain messages are illustrated in FIGS. 5B-5E, one of ordinary skill in the art, having had the benefit of the present disclosure, will recognize and appreciate that other messages having alternative formats may additionally and/or alternatively be utilized. Also, multiple messages illustrated in FIGS. 5B-5E may be combined together in a single message. For example, the messages of dimming schedule, energy source choice, battery charge indication, and LOD operation setting can be combined together into a single message and sent to a local light controller managing a light unit or a group of light units as a single message.

Figure 6:
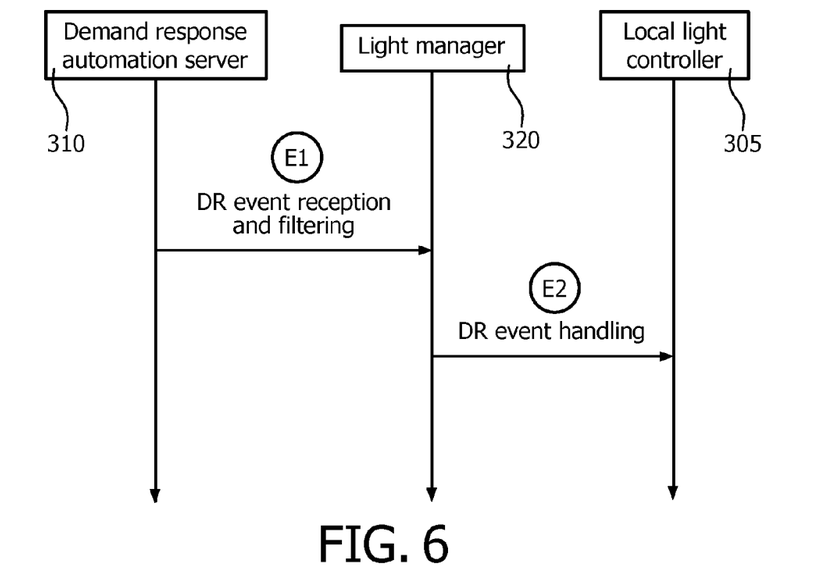
FIG. 6 illustrates a flow chart of an embodiment of demand response event handling.

Referring now FIG. 6, a flow chart of an embodiment of demand response event handling is illustrated. In step E1, the light manger receives a DR event from the DRAS, filters the DR event, and compares the load management request of the DR event with the status of current proactive energy management of lighting units controlled by the light manager. Based on the comparison, the light manager decides whether it is necessary to adjust the load of the lighting units and, if so, to what extent to further adjust the load. The adjustment of the load could go up or down depending on the status of the received DR event. For example, if the received DR even indicates an improved price of energy it may be desirable to increase the load and improve light output characteristics in one or more DR zones. In step E2, the light manager sends load management signaling to a local light controller to adjust the load as determined. Step E2 is similar to step P3 of FIG. 4. However, E2 provides signaling for only one or more DR subintervals and not an entire DR interval.

In some embodiments, in steps P3 and/or E2, the security level of load management signaling sent from a light manager to a local light controller may be associated with the DR level and/or the priority of the DR zone. For example, the higher the DR level (with larger load shedding), the higher the level of security measures that may be added to transmit and authenticate the load management signaling from the light manager to local light controllers. Also, for example, the higher priority the DR zone (e.g., intersections or high pedestrian traffic areas), the higher the level of security measures that may be added to transmit and authenticate the load management signaling from the light manager to local light controllers. Higher levels of security may protect from illegal and/or mistaken manipulation of lighting control.

Figure 7:
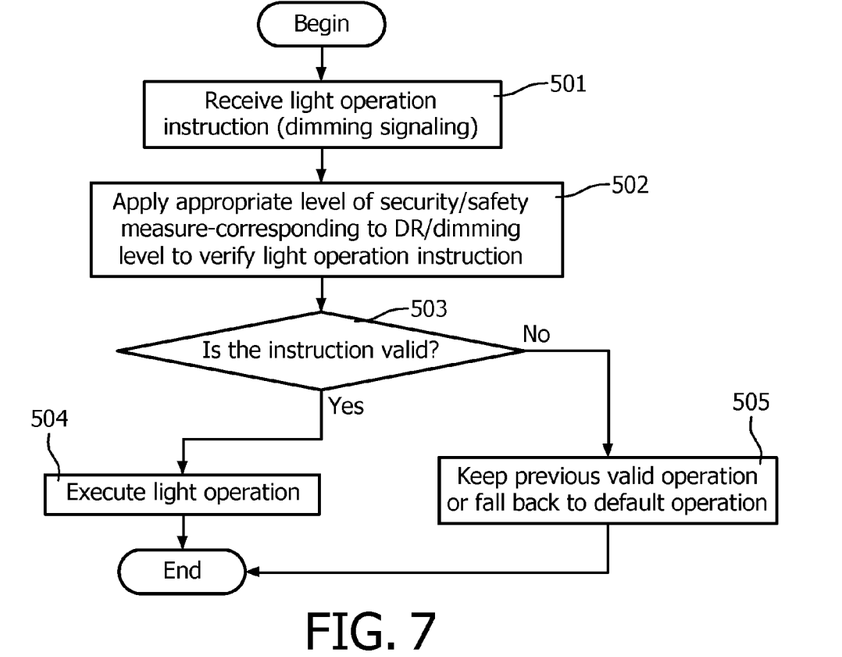
FIG. 7 illustrates a flow chart of an embodiment of lighting operation instruction processing by a local light controller.

FIG. 7 illustrates a flow chart of an embodiment of lighting operation instruction processing by a local light controller. FIG. 7 shows that a local light controller receives lighting operation instructions at step 501 from a light manager. At step 502 the light controller processes the lighting operation instructions received and verifies the lighting operation instructions in accordance with the DR level. That is, the higher the DR level, the higher the level of security that will be applied to verify the lighting operation instructions. At step 503 it is determined whether the lighting operation instructions are valid. If the lighting operation instructions are valid, then at step 504 the lighting controller transmits those instructions to one or more lighting units. If the lighting operation instructions are not valid, then at step 505 the lighting controller maintains the previous valid lighting operation instructions at the lighting units or reverts the lighting units back to a default operating state.

In certain circumstances (e.g., emergency response situations), load shedding has to be substantial such that the lighting performance in certain areas will be below regulation-required level or completely shut off. In such a situation, the local light controller may execute the DR with enough security measures taken to ensure the DR and resulting light operation instructions are authenticated. In some embodiments only one authentication method is needed to validate lighting operation instructions when the DR level and the DR zone are both low priority. In some embodiments two authentication methods may be needed to validate lighting operation instructions when one of the DR level and the DR zone are high priority. In some embodiments three authentication methods may be needed to validate lighting operation instructions when both of the DR level and the DR zone are high priority.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of proactively adjusting energy demand of at least one outdoor lighting network connected to a smart power grid, comprising:
   collecting first zone energy supply information and first zone load demand information of each of a plurality of first zone lighting units of said lighting network for each of a plurality of first zone subintervals (P1);
   collecting second zone energy supply information and second zone load demand information of each of a plurality of second zone lighting units of said lighting network for each of a plurality of second zone subintervals (P1);
   receiving electricity prices from a utility for a plurality of future first zone subintervals of said first zone subintervals and for a plurality of future second zone subintervals of said second zone subintervals
   proactively adjusting a first zone light operation strategy of said first zone lighting units prior to said future first zone subintervals based on said first zone energy supply information, said first zone load demand information, and said electricity prices (P3); and
   proactively adjusting a second zone light operation strategy of said second zone lighting units prior to said future second zone subintervals based on said second zone energy supply information, said second zone load demand information, and said electricity prices (P3).

2. The method of claim 1, further comprising bidding said electricity prices from said utility based on said first zone load demand information and said second zone load demand information (P2).

3. The method of claim 1, wherein said step of proactively adjusting said first zone light operation strategy of said first zone lighting units prior to said future first zone subintervals is also based on first zone lighting regulation requirements of said first zone.

4. The method of claim 3, wherein said step of proactively adjusting said second zone light operation strategy of said second zone lighting units prior to said future second zone subintervals is also based on second zone lighting regulation requirements of said second zone.

5. The method of claim 4, wherein said second zone lighting regulation requirements are of lesser priority than said first zone lighting regulation requirements and wherein said second zone light operation strategy is adjusted more drastically than said first zone light operation strategy.

6. The method of claim 1, wherein said step of proactively adjusting said first zone light operation strategy of said first zone lighting units prior to said future first zone subintervals is also based on dimming capabilities of said first zone lighting units.

7. The method of claim 1, wherein said step of proactively adjusting said first zone light operation strategy of said first zone lighting units includes dimming said first zone lighting units according to one of a plurality of first zone lighting unit dimming vectors each corresponding to one of a plurality of first zone demand response levels.

8. The method of claim 7, wherein said step of proactively adjusting said second zone light operation strategy of said second zone lighting units includes dimming said second zone lighting units according to one of a plurality of second zone lighting unit dimming vectors each corresponding to one of a plurality of second zone demand response levels.

9. The method of claim 8, wherein said first zone lighting unit dimming vectors and said first zone demand response levels are normalized to said second zone lighting unit dimming vectors and said second zone demand response levels, in terms of relative lighting performance to best-practice lighting performance.

10. The method of claim 1, wherein said step of proactively adjusting said first zone light operation strategy of said first zone lighting units prior to said future first zone subintervals includes proactively charging an off-grid power source with said smart power grid prior to utilizing said off-grid power source to power at least one of said first zone lighting units during at least one of said future first zone subintervals.

11. A method of adjusting energy demand of at least one outdoor lighting network connected to a smart power grid, comprising:

dimming lighting units of said lighting network according to one of a plurality of lighting unit dimming vectors each corresponding to one of a plurality of demand response levels;

wherein said lighting units are dimmed most drastically at a highest of said demand response levels and are dimmed least drastically at a lowest of said demand response levels;

receiving a demand response signal corresponding to one of said demand response levels;

transmitting a dimming signal to cause dimming of said lighting units in correspondence with said demand response signal;

wherein when said demand response signal corresponds to said lowest of said demand response levels a first security level is applied to said dimming signal;

wherein when said demand response signal corresponds to said highest of said demand response levels a second security level is applied to said dimming signal;

wherein said second security level is more secure than said first security level.

12. The method of claim 11, wherein said first security level includes a single authentication method.

13. The method of claim 12, wherein said second security level includes at least two authentication methods.

14. The method of claim 11, further comprising dimming second lighting units of said lighting network according to one of a plurality of second lighting unit dimming vectors each corresponding to one of a plurality of said demand response levels, wherein said second lighting units are dimmed most drastically at said highest of said demand response levels and are dimmed least drastically at said lowest of said demand response levels.

15. The method of claim 14, wherein said first lighting unit dimming vectors are normalized to said second lighting unit dimming vectors and said second zone demand response levels, in terms of relative lighting performance to best-practice lighting performance.

16. The method of claim 15, wherein said first lighting units have first zone lighting regulation requirements and said second lighting units have second zone lighting regulation requirements.

17. The method of claim 16, wherein said second zone lighting regulation requirements are of lesser priority than said first zone lighting regulation requirements and wherein dimming is adjusted more drastically among said second lighting units than said first lighting units in response to said highest of said demand response levels.

\* \* \* \* \*